(12) United States Patent
Shigeeda et al.

(10) Patent No.: US 9,923,733 B2
(45) Date of Patent: Mar. 20, 2018

(54) NETWORK SYSTEM AND COMMUNICATION APPARATUS FOR PERFORMING COMMUNICATION AMONG NETWORKS HAVING DIFFERENT VLAN SETTINGS

(75) Inventors: Tetsuya Shigeeda, Tokyo (JP); Shingo Honda, Tokyo (JP)

(73) Assignee: MITSUBISHI ELECTRIC CORPORATION, Chiyoda-Ku, Tokyo (JP)

(*) Notice: Subject to any disclaimer, the term of this patent is extended or adjusted under 35 U.S.C. 154(b) by 408 days.

(21) Appl. No.: 14/423,738

(22) PCT Filed: Aug. 28, 2012

(86) PCT No.: PCT/JP2012/071690
§ 371 (c)(1),
(2), (4) Date: Feb. 25, 2015

(87) PCT Pub. No.: WO2014/033835
PCT Pub. Date: Mar. 6, 2014

(65) Prior Publication Data
US 2015/0244543 A1 Aug. 27, 2015

(51) Int. Cl.
*H04L 12/46* (2006.01)
*H04L 12/40* (2006.01)
(Continued)

(52) U.S. Cl.
CPC .......... *H04L 12/4641* (2013.01); *H04L 12/18* (2013.01); *H04L 12/40* (2013.01);
(Continued)

(58) Field of Classification Search
CPC ..... H04L 12/18; H04L 12/40; H04L 12/4641; H04L 2012/40293; H04L 45/72; H04L 47/10
See application file for complete search history.

(56) References Cited

U.S. PATENT DOCUMENTS 6,112,251 A 8/2000 Rijhsinghani
6,115,385 A * 9/2000 Vig .................. H04L 29/12009
370/401
(Continued)

FOREIGN PATENT DOCUMENTS

CN 1871811 A 11/2006
CN 1879379 A 12/2006
(Continued)

OTHER PUBLICATIONS

Extended European Search Report dated Apr. 14, 2016 issued in corresponding European Patent Appln. No. 12883460.3 (11 pages).
(Continued)

*Primary Examiner* — Dung B Huynh
(74) *Attorney, Agent, or Firm* — Buchanan Ingersoll & Rooney PC

(57) ABSTRACT

A network system that comprises a plurality of communication apparatuses, each of the communication apparatuses being capable of performing a VLAN setting by using a VLAN number set for a connection port, that sets a VLAN number for each of the communication apparatuses, and that performs communication among cars of a train, wherein in a case where a specific type of packet that disables a VLAN setting is a packet of a multicast address, when a distribution target apparatus is connected to a communication apparatus that has received the specific type of packet, the communication apparatus transfers the specific type of packet to the distribution target apparatus and, irrespective of a VLAN number set for another communication apparatus, regards a VLAN different from a VLAN of the communication apparatus as a same network and transfers the specific type of packet to the another communication apparatus.

8 Claims, 4 Drawing Sheets

(51) Int. Cl.
*H04L 12/18* (2006.01)
*H04L 12/721* (2013.01)
*H04L 12/801* (2013.01)

(52) U.S. Cl.
CPC .............. *H04L 45/72* (2013.01); *H04L 47/10* (2013.01); *H04L 2012/40293* (2013.01)

(56) References Cited

U.S. PATENT DOCUMENTS

| | | | |
|---|---|---|---|
| 6,765,914 B1* | 7/2004 | Jain | H04L 12/4641 370/390 |
| 6,912,589 B1 | 6/2005 | Jain et al. | |
| 7,420,979 B2 | 9/2008 | Nozue et al. | |
| 7,469,298 B2 | 12/2008 | Kitada et al. | |
| 7,529,244 B2 | 5/2009 | Tabu | |
| 8,094,660 B2 | 1/2012 | Nozue et al. | |
| 2002/0052972 A1* | 5/2002 | Yim | H04L 12/467 709/245 |
| 2003/0012202 A1* | 1/2003 | Fukutomi | H04L 12/185 370/395.52 |
| 2004/0028058 A1* | 2/2004 | Katoh | H04L 12/1886 370/395.53 |
| 2005/0041665 A1* | 2/2005 | Weyman | H04L 45/04 370/390 |
| 2005/0078632 A1* | 4/2005 | Aramaki | H04L 45/00 370/331 |
| 2006/0180709 A1* | 8/2006 | Breton | B61L 15/0036 246/1 C |
| 2007/0088829 A1* | 4/2007 | Shima | H04L 45/60 709/226 |
| 2007/0104192 A1* | 5/2007 | Yoon | H04L 12/4641 370/389 |
| 2007/0171918 A1* | 7/2007 | Ota | H04L 12/2856 370/395.53 |
| 2008/0137660 A1* | 6/2008 | Olakangil | H04L 12/1836 370/392 |
| 2012/0213085 A1* | 8/2012 | Koren | H04W 4/06 370/241 |

FOREIGN PATENT DOCUMENTS

| | | |
|---|---|---|
| CN | 101060449 A | 10/2007 |
| CN | 102377578 A | 3/2012 |
| JP | 2000-049485 A | 2/2000 |
| JP | 2003-060675 A | 2/2003 |
| JP | 2003-198588 A | 7/2003 |
| JP | 2004-072160 A | 3/2004 |
| JP | 2004-112159 A | 4/2004 |
| JP | 2005-151509 A | 6/2005 |
| JP | 2007-005892 A | 1/2007 |
| JP | 2009-278317 A | 11/2009 |
| JP | 2011-114495 A | 6/2011 |
| JP | 2011-205777 A | 10/2011 |

OTHER PUBLICATIONS

International Search Report (PCT/ISA/210) dated Dec. 4, 2012, by the Japanese Patent Office as the International Searching Authority for International Application No. PCT/JP2012/071690.
Written Opinion (PCT/ISA/237) dated Dec. 4, 2012, by the Japanese Patent Office as the International Searching Authority for International Application No. PCT/JP2012/071690.
Japanese Office Action for JP 2013-500254 dated Feb. 19, 2015 (w/English translation), 5 pgs.
Office Action issued by the Chinese Patent Office dated Apr. 5, 2017 in corresponding Chinese Application No. 201280075425.8 with English language translation (8 pages).
Office Action issued by the Chinese Patent Office dated Dec. 5, 2017 in corresponding Chinese Application No. 201280075425.8 with English language translation (6 pages).

* cited by examiner

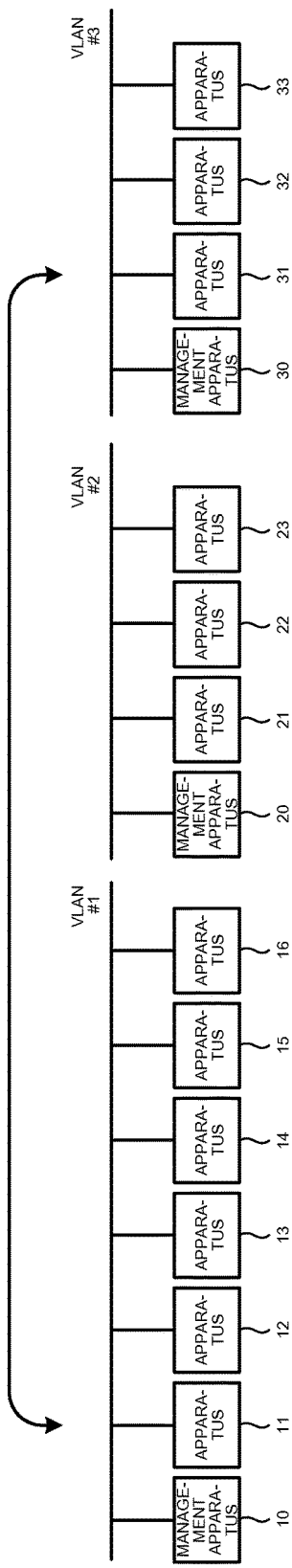

NETWORK SYSTEM AND COMMUNICATION APPARATUS FOR PERFORMING COMMUNICATION AMONG NETWORKS HAVING DIFFERENT VLAN SETTINGS

FIELD

The present invention relates to a network system and a communication apparatus that perform communication by VLANs.

BACKGROUND

Communication using VLANs (Virtual Local Area Networks) has been performed. In a system that shares a network, the VLANs can divide and use the network. For example, in a system in which a plurality of communication apparatuses (hubs) are connected, by performing VLAN settings on the connection ports of the communication apparatuses (the hubs), one network in physical arrangement can be logically operated as a plurality of networks. Such a technology is disclosed in Patent Literatures 1 to 3.

CITATION LIST

Patent Literature

Patent Literature 1: Japanese Patent Application Laid-Open No. 2007-5892
Patent Literature 2: Japanese Patent Application Laid-Open No. 2003-198588
Patent Literature 3: Japanese Patent Application Laid-Open No. 2004-72160

SUMMARY

Technical Problem

However, according to the conventional technology, communication can be performed only in the network having the same VLAN setting. Therefore, there is a problem in that communication cannot be performed among communication apparatuses having different VLAN settings even if a plurality of communication apparatuses are connected.

The present invention has been devised in view of the above, and it is an object of the present invention to obtain a network system and a communication apparatus that can perform communication among communication apparatuses having different VLAN settings.

Solution to Problem

In order to solve the above problems and achieve the object, the present invention relates to a network system that comprises a plurality of communication apparatuses, each of the communication apparatuses being capable of performing a VLAN setting by using a VLAN number set for a connection port, that sets a VLAN number for each of the communication apparatuses, and that performs communication among cars of a train, wherein in a case where a specific type of packet that disables a VLAN setting is a packet of a multicast address, when a distribution target apparatus is connected to a communication apparatus that has received the specific type of packet, the communication apparatus transfers the specific type of packet to the distribution target apparatus and, irrespective of a VLAN number set for another communication apparatus, regards a VLAN different from a VLAN of the communication apparatus as a same network and transfers the specific type of packet to the another communication apparatus.

Advantageous Effects of Invention

The network system according to the present invention attains an effect that it is possible to perform communication among communication apparatuses having different VLAN settings.

BRIEF DESCRIPTION OF DRAWINGS

FIG. 4 is a diagram illustrating the state of a network when the specific type of packet is used.

DESCRIPTION OF EMBODIMENTS

Exemplary embodiments of a network system and a communication apparatus according to the present invention are explained in detail below with reference to the drawings. Note that the present invention is not limited to the embodiments.

Embodiment

Figure 1:
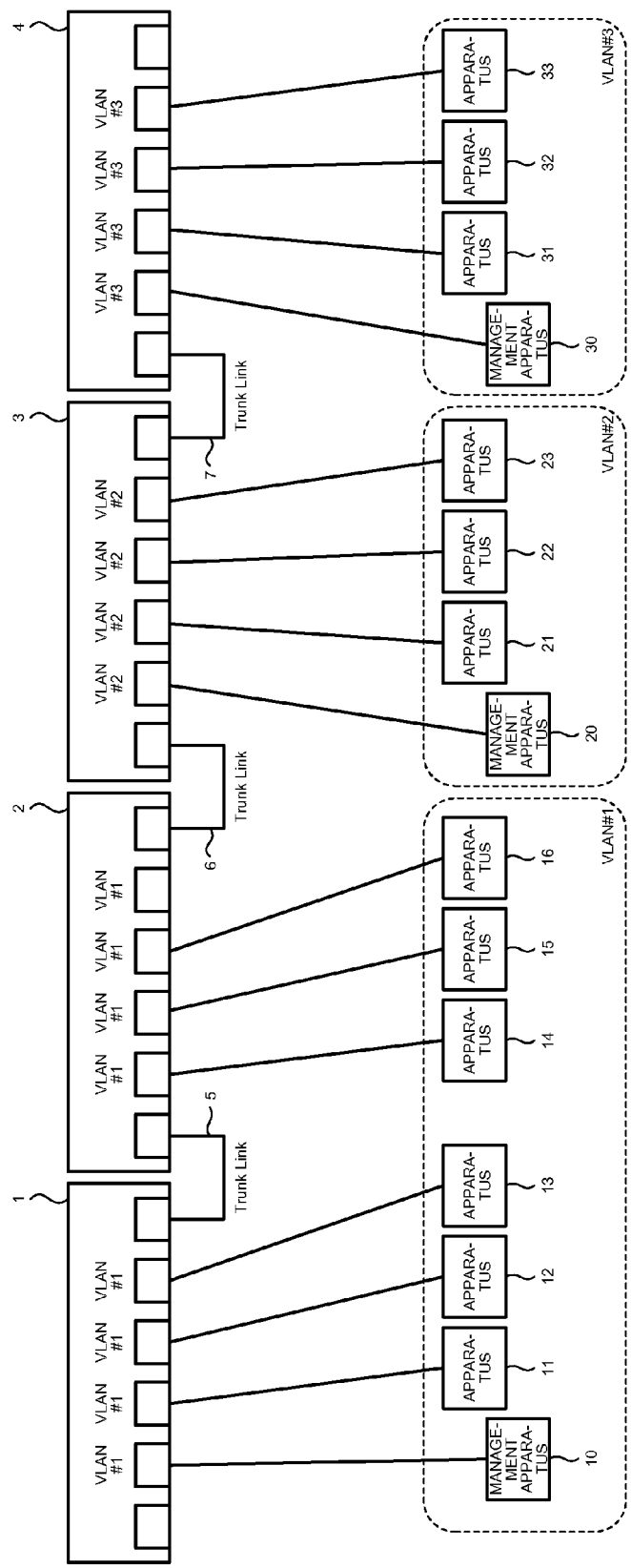
FIG. 1 is a diagram illustrating a configuration example of a network system including communication apparatuses.

FIG. 1 is a diagram illustrating a configuration example of a network system including communication apparatuses according to the present embodiment. Physical connections of apparatuses are shown. The network system includes communication apparatuses 1, 2, 3, and 4. The communication apparatuses 1 and 2 are connected by a Trunk Link 5. The communication apparatuses 2 and 3 are connected by a Trunk Link 6. The communication apparatuses 3 and 4 are connected by a Trunk Link 7.

A management apparatus 10 and apparatuses 11 to 13, which are connected to the VLAN #1 setting ports, are connected to the communication apparatus 1. Apparatuses 14 to 16, which are connected to the VLAN #1 setting ports, are connected to the communication apparatus 2. A management apparatus 20 and apparatuses 21 to 23, which are connected to the VLAN #2 setting ports, are connected to the communication apparatus 3. A management apparatus 30 and apparatuses 31 to 33, which are connected to the VLAN #3 setting ports, are connected to the communication apparatus 4. The communication apparatuses 1 to 4 each include a plurality of connection ports. The communication apparatuses 1 to 4 can perform VLAN settings by using VLAN numbers set for the connection ports. A specific example of the network system is a system in which, in a train formation, a communication apparatus in provided in each car and communication is performed among the cars by connecting the cars through Trunk Links. However, the network system is not limited to such communication among the cars.

Figure 2:
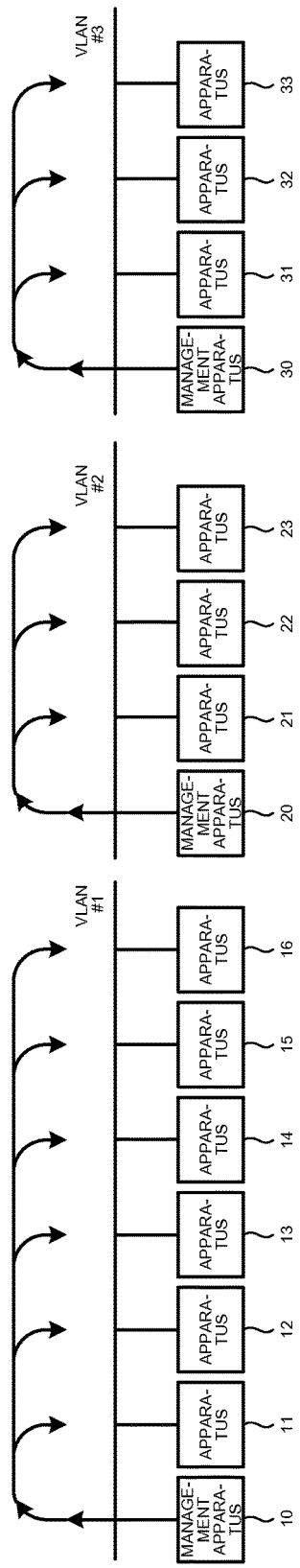
FIG. 2 is a diagram illustrating the state of a normal network conforming to VLAN settings.

FIG. 2 is a diagram illustrating the state of a normal network conforming to VLAN settings. As shown in FIG. 2, the management apparatus 10 and the apparatuses 11 to 16 are connected to a network of a VLAN #1. Usually, the management apparatus 10 and the apparatuses 11 to 16 can perform communication only in the network set by this port VLAN #1. The management apparatus 20 and the apparatuses 21 to 23 are connected to a network of a VLAN #2. Usually, the management apparatus 20 and the apparatuses 21 to 23 can perform communication only in the network set by this port VLAN #2. The management apparatus 30 and the apparatuses 31 to 33 are connected to a network of a VLAN #3. Usually, the management apparatus 30 and the apparatuses 31 to 33 can perform communication only in the network set by this port VLAN #3.

When communication is performed among cars, for example, a system is conceivable in which one communication apparatus is arranged in each of the cars and a VLAN is set for each of the cars. As an apparatus connected to each communication apparatus, there is a management apparatus that manages communication of a corresponding VLAN. As an apparatus connected to each communication apparatus, there are, for example, a guidance display apparatus, a destination display apparatus, and a sound data output apparatus. However, apparatuses connected to each communication apparatus are not limited to these apparatuses.

Next, an explanation will be made of a case where communication is performed by a certain apparatus with apparatuses connected to communication apparatuses of other VLAN settings. Specifically, a microphone (an apparatus) connected to a communication apparatus of any car is used to output sound data from sound data output apparatuses connected to communication apparatuses of all cars in a train formation. When a certain apparatus performs communication with apparatuses connected to other VLANs, in the present embodiment, a specific type of packet is used. The specific type indicates a port number corresponding to "80" or "110" in TCP/UDP, an IP address, a MAC address, or the like. For example, when one apparatus transmits data to apparatuses connected to networks of VLANs having the same and different settings, the apparatus on the transmission side performs communication using a specific multicast address. When a multicast address is set as an IP address, a MAC address can also be determined. In each communication apparatus, passage permission is set in a table or the like included in its own apparatus in advance for the specific type of packet, whereby a packet for disabling the VLANs can be defined in the system.

Figure 3:
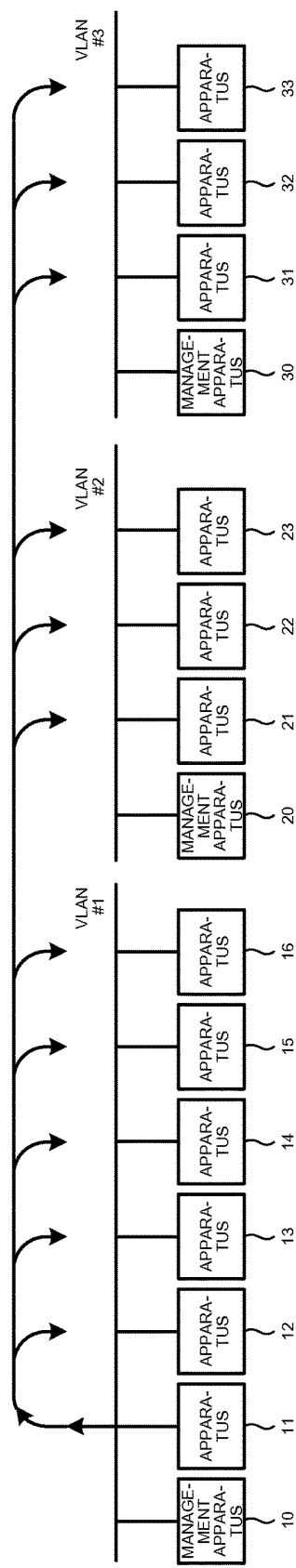
FIG. 3 is a diagram illustrating the state of a network when a specific type of packet is used.

FIG. 3 is a diagram illustrating the state of a network when the specific type of packet is used. The state of the network in the case of multicast is explained. For example, when the apparatus 11 transmits data to the apparatuses connected to the networks of the VLANs having the same and different settings, the apparatus 11 transmits the specific type of packet in multicast. In this case, in the connection ports to which the apparatuses are connected, each communication apparatus sets passage permission for the multicast address. Multicast addresses permitted to pass are set in advance in each communication apparatus. Note that, in each communication apparatus, the multicast address is not permitted to pass through the connection port to which the management apparatus is connected. Consequently, in each communication apparatus, apparatuses connected to ports for which passage permission is set in advance can receive data in multicast. On the other hand, the management apparatuses cannot receive data in multicast according to a packet filtering function.

Specifically, when the apparatus 11 communicates with the apparatuses 12 to 16 on the VLAN #1 side, the apparatuses 21 to 23 on the VLAN #2 side, and the apparatuses 31 to 33 on the VLAN #3 side, the apparatus 11 transmits the specific type of packet to the communication apparatus 1. The communication apparatus 1 transfers the specific type of packet received from the apparatus 11 to the apparatuses 12 and 13 that are desired destinations and the communication apparatus 2. The communication apparatus 2 transfers the specific type of packet received from the communication apparatus 1 to the apparatuses 14 to 16 that are desired destinations. Moreover, irrespective of the setting of the port VLANs (ignoring the setting of the port VLANs), the communication apparatus 2 transfers the specific type of packet received from the communication apparatus 1 to the communication apparatus 3. Irrespective of the setting of the port VLANs (ignoring the setting of the port VLANs), the communication apparatus 3 transfers the specific type of packet received from the communication apparatus 2 to the apparatuses 21 to 23 that are desired destinations and the communication apparatus 4. Irrespective of the setting of the port VLANs (ignoring the setting of the port VLANs), the communication apparatus 4 transfers the specific type of packet received from the communication apparatus 3 to the apparatuses 31 to 33 that are desired destinations.

As explained above, when receiving the specific type of packet from the apparatus 11, the communication apparatuses 3 and 4 disable the settings of the port VLANs and operate while regarding the networks of the VLAN #2 and the VLAN #3, respectively, as the same network as the VLAN #1.

Note that communication among the VLANs is not limited to multicast and can also be performed in unicast. FIG. 4 is a diagram illustrating the state of a network when the specific type of packet is used. The state of the network in the case of unicast is explained here. For example, when the apparatus 11 transmits data to the apparatus 31 connected to the network of the VLAN having a different setting, the apparatus 11 transmits the specific type of packet in unicast. In this case, as explained above, in the connection ports to which the apparatuses are connected, each communication apparatus sets passage permission for the unicast address. Unicast addresses permitted to pass are set in advance in each communication apparatus.

Specifically, when the apparatus 11 communicates with the apparatus 31 on the VLAN #3 side, the apparatus 11 transmits the specific type of packet to the communication apparatus 1. The communication apparatus 1 transfers the specific type of packet received from the apparatus 11 to the communication apparatus 2. Irrespective of the setting of the port VLANs (ignoring the setting of the port VLANs), the communication apparatus 2 transfers the specific type of packet received from the communication apparatus 1 to the communication apparatus 3. Irrespective of the setting of the port VLANs (ignoring the setting of the port VLANs), the communication apparatus 3 transfers the specific type of packet received from the communication apparatus 2 to the communication apparatus 4. Irrespective of the setting of the port VLANs (ignoring the setting of the port VLANs), the communication apparatus 4 transfers the specific type of packet received from the communication apparatus 3 to the apparatus 31 that is a desired destination.

As in the case of multicast, when receiving the specific type of packet from the apparatus 11, the communication apparatuses 3 and 4 disable the settings of the port VLANs and operate while regarding the networks of the VLAN #2 and the VLAN #3, respectively, as the same network as the VLAN #1.

As explained above, according to the present embodiment, in a network system configured from a plurality of communication apparatuses, irrespective of the VLAN settings, a communication apparatus that has received a specific type of packet regards a plurality of VLANs as the same network and transfers the received packet to apparatuses that are connected to the connection ports and are desired destinations and adjacent communication apparatuses. Consequently, in a system that shares a network, it is possible to perform communication among networks having different VLAN settings.

REFERENCE SIGNS LIST 1, 2, 3, 4 communication apparatus, 5, 6, 7 Trunk Link, 10, 20, 30 management apparatus, 11 to 16, 21 to 23, 31 to 33 apparatus.

The invention claimed is:

1. A network system comprising:
a plurality of communication apparatuses, each of the communication apparatuses being capable of performing a VLAN setting by using a VLAN number set for a connection port, that sets a VLAN number for each of the communication apparatuses, and that performs communication among cars of a train, wherein
the communication apparatus determines, on a basis of information that is given to a packet and identifies a type of communication, whether a received packet is a packet that is set to be permitted to pass and is a specific type of packet that disables a VLAN setting, and in a case where the communication apparatus receives a packet of a multicast address as the specific type of packet, when a distribution target apparatus is connected to the communication apparatus, the communication apparatus transfers the specific type of packet to the distribution target apparatus, disables setting of a VLAN number set for another communication apparatus, regards a VLAN different from a VLAN of the communication apparatus as a same network, and transfers the specific type of packet to the another communication apparatus.

2. The network system according to claim 1, wherein the specific type of packet is a packet having a specific MAC address.

3. A network system comprising:
a plurality of communication apparatuses, each of the communication apparatuses being capable of performing a VLAN setting by using a VLAN number set for a connection port, that sets a VLAN number for each of the communication apparatuses, and that performs communication among cars of a train, wherein
the communication apparatus determines, on a basis of information that is given to a packet and identifies a type of communication, whether a received packet is a packet that is set to be permitted to pass and is a specific type of packet that disables a VLAN setting, and in a case where the communication apparatus receives a packet of a unicast address as the specific type of packet, when a destination of the specific type of packet is an apparatus connected to the communication apparatus, the communication apparatus transfers the packet to the apparatus at a desired destination and, when a destination of the specific type of packet is an apparatus connected to another communication apparatus, the communication apparatus disables setting of a VLAN number set for the another communication apparatus, regards a VLAN different from a VLAN of the communication apparatus as a same network, and transfers the specific type of packet to the another communication apparatus.

4. The network system according to claim 3, wherein the specific type of packet is a packet having a specific MAC address.

5. A communication apparatus comprising:
at least one connection port, wherein the communication apparatus is in a network system that comprises a plurality of communication apparatuses, each of the communication apparatuses being capable of performing a VLAN setting by using a VLAN number set for a connection port, and wherein the communication apparatus sets a VLAN number for each of the communication apparatuses, and that performs communication among cars of a train, wherein the communication apparatus determines, on a basis of information that is given to a packet and identifies a type of communication, whether a received packet is a packet that is set to be permitted to pass and is a specific type of packet that disables a VLAN setting, and in a case where the communication apparatus receives a packet of a multicast address as the specific type of packet, when a distribution target apparatus is connected to the communication apparatus, the communication apparatus transfers the specific type of packet to the distribution target apparatus, disables setting of a VLAN number set for another communication apparatus, regards a VLAN different from a VLAN of the communication apparatus as a same network, and transfers the specific type of packet to the another communication apparatus.

6. The communication apparatus according to claim 5, wherein the specific type of packet is a packet having a specific MAC address.

7. A communication apparatus comprising:
at least one connection port, wherein the communication apparatus is in a network system that comprises a plurality of communication apparatuses, each of the communication apparatuses being capable of performing a VLAN setting by using a VLAN number set for a connection port, and wherein the communication apparatus sets a VLAN number for each of the communication apparatuses, and that performs communication among cars of a train, wherein the communication apparatus determines, on a basis of information that is given to a packet and identifies a type of communication, whether a received packet is a packet that is set to be permitted to pass and is a specific type of packet that disables a VLAN setting, and in a case where the communication apparatus receives a packet of a unicast address as the specific type of packet, when a destination of the specific type of packet is an apparatus connected to the communication apparatus, the communication apparatus transfers the packet to the apparatus at a desired destination and, when a destination of the specific type of packet is an apparatus connected to another communication apparatus, the communication apparatus disables setting of a VLAN number set for the another communication apparatus, regards a VLAN different from a VLAN of the communication apparatus as a same network, and transfers the specific type of packet to the another communication apparatus.

8. The communication apparatus according to claim 7, wherein the specific type of packet is a packet having a specific MAC address.

* * * * *